US012638345B1

(12) United States Patent
Hamel et al.

(10) Patent No.: US 12,638,345 B1
(45) Date of Patent: May 26, 2026

(54) MICROCALORIMETER RADIATION DETECTOR ABSORBERS AND METHODS OF MAKING THE SAME

(71) Applicants: National Technology & Engineering Solutions of Sandia, LLC, Albuquerque, NM (US); Los Alamos National Security, LLC, Los Alamos, NM (US)

(72) Inventors: Michael C. Hamel, Albuquerque, NM (US); Jamin R. Pillars, Albuquerque, NM (US); Christian L. Arrington, Albuquerque, NM (US); Jesse J. Bland, Albuquerque, NM (US); Stephen M. Carr, Albuquerque, NM (US); Mark P. Croce, Los Alamos, NM (US)

(73) Assignees: National Technology & Engineering Solutions of Sandia, LLC, Albuquerque, NM (US); Los Alamos National Security, LLC, Los Alamos, NM (US)

( * ) Notice: Subject to any disclaimer, the term of this patent is extended or adjusted under 35 U.S.C. 154(b) by 1137 days.

(21) Appl. No.: 17/673,507

(22) Filed: Feb. 16, 2022

Related U.S. Application Data

(60) Provisional application No. 63/150,246, filed on Feb. 17, 2021.

(51) Int. Cl.
| | |
|---|---|
| *G01K 17/00* | (2006.01) |
| *C25D 5/00* | (2006.01) |
| *G01K 17/20* | (2006.01) |

(52) U.S. Cl.
CPC ............ *G01K 17/006* (2013.01); *C25D 5/00* (2013.01); *C25D 5/60* (2020.08); *C25D 5/617* (2020.08); *G01K 17/20* (2013.01)

(58) Field of Classification Search
CPC ........ G01K 17/006; G01K 17/20; C25D 5/00; C25D 5/60; C25D 5/617
See application file for complete search history.

(56) References Cited

U.S. PATENT DOCUMENTS

| | | | | |
|---|---|---|---|---|
| 2,458,912 A | * | 1/1949 | Lowenheim | C25D 3/30 205/140 |
| 4,394,223 A | * | 7/1983 | Hall | C25D 5/02 205/125 |
| 4,599,149 A | * | 7/1986 | Nobel | C25D 3/56 205/302 |
| 5,039,576 A | * | 8/1991 | Wilson | C25D 3/60 428/626 |
| 5,215,631 A | * | 6/1993 | Westfall | H01L 21/02628 205/397 |
| 7,309,411 B2 | * | 12/2007 | Herdman | C25D 3/60 205/252 |

(Continued)

*Primary Examiner* — David P Porta
*Assistant Examiner* — Gisselle M Gutierrez
(74) *Attorney, Agent, or Firm* — Daniel J. Jenkins; Kenneth P. McNeill

(57) ABSTRACT

A microcalorimeter radiation detector that includes a tin absorber having orientations of (420) and (311) with grain sizes greater than 100 nm. Tin absorber blanks were electroplated on a sacrificial substrate changing chemistry makeup, current density, and time to realize pure tin deposition of the desired characteristics.

23 Claims, 8 Drawing Sheets

(56)       References Cited

U.S. PATENT DOCUMENTS

| | | | |
|---|---|---|---|
| 8,603,315 B2 * | 12/2013 | Taylor | C25D 3/30 |
| | | | 205/241 |
| 11,293,111 B2 * | 4/2022 | Yu | C25D 3/58 |
| 11,505,874 B2 * | 11/2022 | Woodrow, III | C25D 3/60 |
| 12,352,634 B1 * | 7/2025 | Carr | G01K 13/006 |
| 2006/0286400 A1 * | 12/2006 | McDaniel | C25D 5/50 |
| | | | 428/689 |
| 2012/0060918 A1 * | 3/2012 | Spitzer | H10F 10/14 |
| | | | 136/257 |
| 2017/0071082 A1 * | 3/2017 | Sadleir | H05K 9/0077 |
| 2023/0151504 A1 * | 5/2023 | Jung | C25D 3/60 |
| | | | 205/253 |
| 2023/0383430 A1 * | 11/2023 | Majumdar | C25D 3/30 |

* cited by examiner shadow mask ultraviolet (UV) tape gold/titanium seed layer shadow mask ultraviolet (UV) tape gold/titanium seed layer ultraviolet (UV) tape gold/titanium seed layer tin

MICROCALORIMETER RADIATION DETECTOR ABSORBERS AND METHODS OF MAKING THE SAME

RELATED APPLICATIONS

This application claims priority to U.S. Provisional Patent Application 63/150,246, filed on Feb. 17, 2021, entitled "MICROCALORIMETER RADIATION DETECTORS AND METHODS OF MAKING THE SAME," the entirety of which is incorporated herein by reference in its entirety.

STATEMENT OF GOVERNMENT INTEREST

This invention was made with Government support under Contract No. DE-NA0003525 awarded by the United States Department of Energy/National Nuclear Security Administration. The U.S. Government has certain rights in the invention.

FIELD

The present disclosure is generally directed to microcalorimeter radiation detector absorber materials and crystal structure, and more specifically directed to methods that form microcalorimeter radiation detector absorbers with a micro-structured tin absorber.

BACKGROUND

Microcalorimeter gamma-ray detectors show promise for nuclear material characterization because their spectral resolution is substantially better than high purity germanium sensors. Microcalorimeter detectors have been fabricated and tested by institutions such as National Institute of Standards and Technology (NIST) and Los Alamos National Laboratory (LANL) by combining microfabricated transition edge sensors (TESs) with bulk tin gamma-ray absorbers. These detectors integrate the absorber into the detector by attaching the absorber onto a sensor platform with posts and/or glue or epoxy. Various tin bulk materials have been used for the absorber. However, these detectors suffer from inconsistent performance, such as, but not limited to varying photopeak energy resolution or the detector failing to detect gamma rays.

What is needed are microcalorimeter gamma-ray detectors and methods of making microcalorimeter gamma-ray detectors having improved performance and that overcome deficiencies of the prior art.

SUMMARY OF THE DISCLOSURE

The present disclosure is directed to microcalorimeter gamma-ray detectors including an absorber having a tin crystal structure with improved performance. The absorber tin medium has a crystalline orientation with two preferred orientations of (420) and (311) as well as a grain size greater than 100 nm for both orientations that produces gamma-ray spectroscopy measurements with consistent high energy-resolution performance compared to the bulk tin absorbers. An analysis of the crystal structure using X-ray diffraction produced the plot in FIG. 1, showing the (420) and (311) preferred orientations.

The present disclosure is further directed to methods to produce microcalorimeter gamma-ray detectors including an absorber having a tin crystal structure with improved performance. The method includes electroplating a tin absorber blank having select crystalline orientations of (420) and (311) with a grain size greater than 100 nm for both orientations and integrating those absorbers into the detector by bonding to the sensor platform. The tin is electroplated using a current of 20 mA/cm² to 80 mA/cm² with a duty cycle of 80% to 90% to produce the desired crystal orientations having (420) and (311) with a grain sizes greater than 100 nm, which shows unexpected improvements by producing consistent energy resolution for all detectors. In an embodiment, the tin is electroplated using a current of 40 mA/cm² to 80 mA/cm². In an embodiment, the current is 40 mA/cm². In an embodiment, the duty cycle is 80%. In an embodiment, the tin is electroplated with an approximate thickness of 380-400 µm and then diced into squares that are approximately 1.5 mm×1.5 mm. These absorbers are then attached using an epoxy to the microcalorimeter platform.

The microcalorimeter radiation detector of the present invention has the advantage of producing consistent energy resolution values for all tin absorbers.

Another advantage of the present disclosure is that the summed signal of arrays of these detectors will have improved energy resolution and detector efficiency compared to arrays where some detectors have poor performance.

Another advantage of the present disclosure is that signals and performance from these detectors will provide a more predicable response than current practice.

Another advantage of the present disclosure is that the tin electroplating process allows for precise control of the absorber size and form factor.

Another advantage of the present disclosure is the formation of an absorber having improved pixel performance.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The present invention is directed to a microcalorimeter radiation detector that includes a tin absorber having preferred orientations of (420) and (311) both with a grain sizes greater than 100 nm. Tin absorber blanks were electroplated on a sacrificial substrate changing chemistry makeup, current density, and time to realize pure tin deposition at thicknesses of 50-1000 microns of the desired characteristics. In an embodiment, the thickness may be 50-750 microns. In an embodiment, the thickness is in the range of 380-400 microns.

Figure 1:
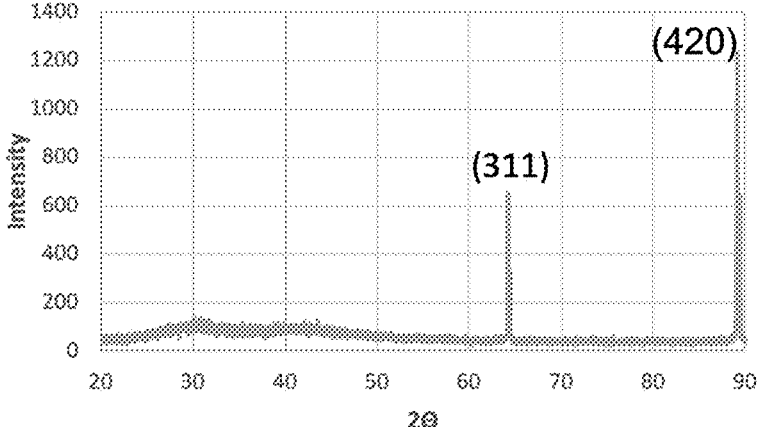
FIG. 1 is a plot of an analysis of the crystal structure using X-ray diffraction showing the (420) and (311) preferred orientations according to an embodiment of the disclosure.
Figure 2:
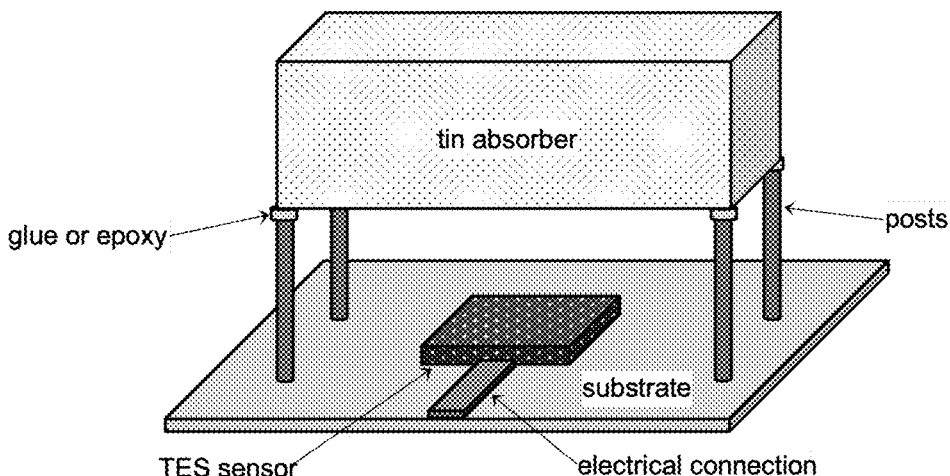
FIG. 2 illustrates an embodiment of a detector having a tin absorber mounted to posts using glue or epoxy that are thermally linked to the TES sensor according to an embodiment of the disclosure.

A sacrificial substrate for the fabrication process is used to deposit a seed layer. In one embodiment of the process, the substrate consists of ultraviolet (UV) tape. The seed layer for the electrodeposition is formed from thin layers of metal, for example but not limited to titanium and gold, which are patterned onto the UV tape. The electroplated tin samples were diced into individual 1.3×1.3 mm sizes and integrated with TES detectors by mounting on a sensor. In an embodiment, the sensor is a transition edge sensor (TES) or a paramagnetic sensor for another embodiment as a metallic magnetic microcalorimeter (MMC). One particular embodiment, shown in FIG. 2, has the tin absorber mounted to posts using glue or epoxy that are thermally linked to the TES sensor. The assembled devices were tested with gamma radiation sources to evaluate performance.

The produced absorbers showed particular preferred orientations in the crystal lattice structure and large grain sizes and exhibited unexpected consistent energy resolution and performance, while samples providing worse resolution showed different orientations with small grain sizes. It is hypothesized that the crystal lattice orientation and grain size produce the differing performance.

The crystal structure of the described tin absorber produces the improved performance over the prior art of using bulk tin. This structure can be produced using a controlled fabrication process resulting in absorbers with a known crystal structure that when used as part of a microcalorimeter gamma-ray provide the desired high photopeak energy resolution.

Figure 3A:
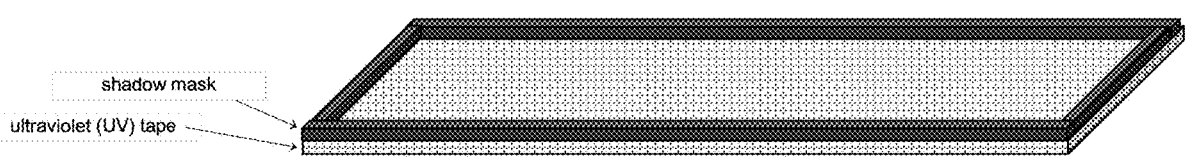
FIG. 3A illustrates a first step of a fabrication process that shows a shadow mask comprised of polylactide polymer laid on UV tape to form a pattern for the seed layer according to an embodiment of the disclosure.
Figure 3B:
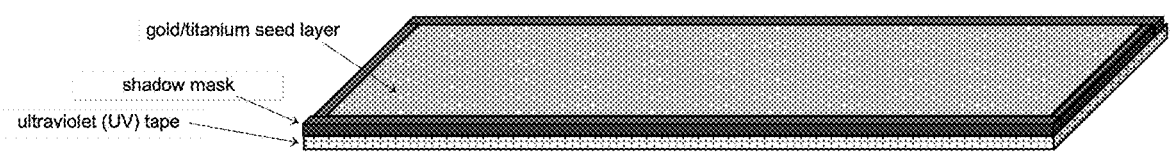
FIG. 3B illustrates a second step of a fabrication process that shows a seed layer comprised of titanium (200 A°) and gold (1000 A°) deposited using an electron beam evaporator.
Figure 3C:
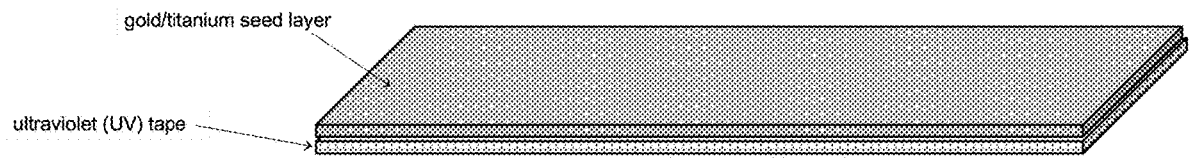
FIG. 3C illustrates a third step of a fabrication process that shows the deposited layer removed from the shadow mask according to an embodiment of the disclosure.
Figure 3D:
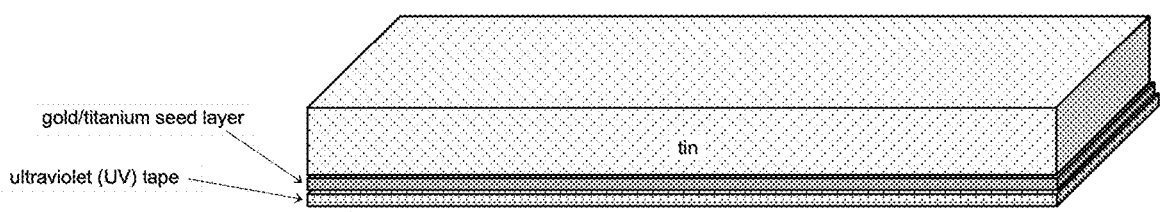
FIG. 3D illustrates a fourth step of a fabrication process that shows tin electrodeposited on top of the seed layer of FIG. 3C according to an embodiment of the disclosure.
Figure 3E:
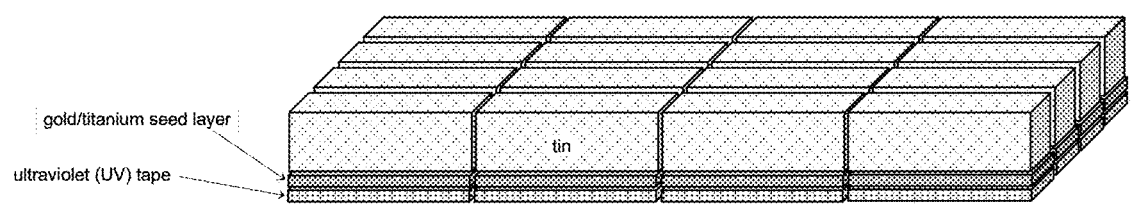
FIG. 3E illustrates a fifth step of a fabrication process that shows after deposition, the tin and UV tape diced to an absorber size of approximately 1.5 mm×1.5 mm according to an embodiment of the disclosure.
Figure 3F:
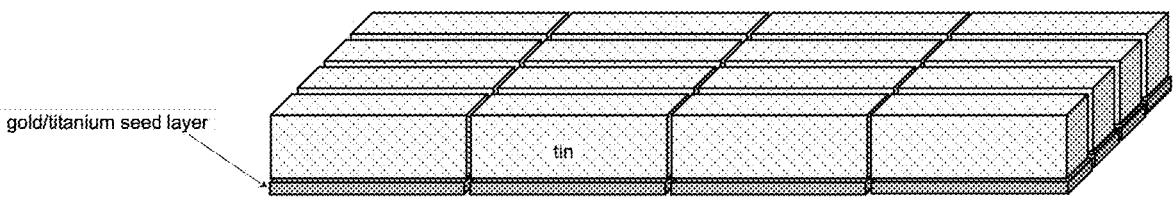
FIG. 3F illustrates a sixth step of a fabrication process that shows the UV tape removed after UV irradiation to yield the tin absorbers according to an embodiment of the disclosure.

The tin absorbers are fabricated using the following process illustrated in FIG. 3A-FIG. 3F. A shadow mask comprised of polylactide polymer is laid on UV tape (FIG. 3A) to form a pattern for the seed layer. A seed layer comprised of titanium (200 A°) and gold (1000 A°) is deposited using an electron beam evaporator (FIG. 3B) and the shadow mask is removed (FIG. 3C). Tin is electrodeposited on top of the seed layer (FIG. 3D). In a particular embodiment a plating current of 40 mA/cm$^2$ with a duty cycle of 80% is used with a commercial tin chemistry (Dow Chemical Solderon BP TS 6000 Tin/Silver Bump Plating Bath) to plate a thickness of 400 μm. To deposit pure tin, the complexor and silver replenisher are not included in the chemistry. After deposition, the tin and UV tape are diced to an absorber size of approximately 1.5 mm×1.5 mm (FIG. 3E). The UV tape is removed after UV irradiation to yield the tin absorbers (FIG. 3F).

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A photon absorber material, comprising:
   a tin material having a controlled preferred crystalline orientation and grain size formed through electroplating.

2. The photon absorber material of claim 1, wherein the preferred crystalline orientation is selected from the group consisting essentially of (420) and (311).

3. The photon absorber material of claim 1, wherein the grain size is greater than 100 nm.

4. A microcalorimeter radiation detector, comprising:
   an absorber material consisting essentially of a tin material having a controlled preferred crystalline orientation and grain size formed through electroplating; and
   a sensor to which the absorber material is bonded.

5. The detector of claim 4, wherein the preferred crystalline orientation is selected from the group consisting essentially of (420) and (311).

6. The detector of claim 4, wherein the grain size is greater than 100 nm.

7. The detector of claim 4, further comprising:
   posts and epoxy bonding the absorber material to the sensor.

8. A method of making an absorber, comprising:
   electroplating tin onto a sacrificial substrate;
   wherein the electroplating is performed using a selected duty cycle to form a tin material having a preferred orientation selected from the group consisting of (420) and (311) and a preferred grain size.

9. The method of claim 8, wherein the selected duty cycle is between 80% and 90%.

10. The method of claim 8, wherein current for the electroplating is between 20 mA/cm$^2$ and 80 mA/cm$^2$.

11. The method of claim 8, wherein current for the electroplating is between 40 mA/cm$^2$ and 80 mA/cm$^2$.

12. The method of claim 8, wherein the sacrificial substrate is ultraviolet tape.

13. The method of claim 8, wherein the tin is plated at a thickness of between 50 and 750 microns.

14. The method of claim 8, further comprising:
   seeding the sacrificial substrate with a metal selected from the group consisting essentially of titanium and gold.

15. The method of claim 8, wherein the preferred grain size is greater than 100 nm.

16. A method of making a microcalorimeter radiation detector comprising:

electroplating tin at a selected current and duty cycle to produce an absorber having a preferred orientation selected from the group consisting essentially of (420) and (311) and a preferred grain size; and bonding the absorber to a sensor.

17. The method of claim 16, wherein the selected duty cycle is between 80% and 90%.

18. The method of claim 16, wherein the selected current for the electroplating is between 20 mA/cm$^2$ and 80 mA/cm$^2$.

19. The method of claim 16, wherein the tin is electroplated onto sacrificial substrate is ultraviolet tape.

20. The method of claim 16, wherein the tin is plated at a thickness of between 50 and 750 microns.

21. The method of claim 16, further comprising:

seeding the sacrificial substrate with a metal selected from the group consisting essentially of titanium and gold.

22. The method of claim 16, wherein the preferred grain size is greater than 100 nm.

23. The method of claim 16, wherein the absorber is bonded to the sensor by posts and epoxy.

* * * * *